(12) United States Patent
Aleksic et al.

(10) Patent No.: US 10,049,666 B2
(45) Date of Patent: Aug. 14, 2018

(54) VOICE RECOGNITION SYSTEM

(71) Applicant: Google LLC, Mountain View, CA (US)

(72) Inventors: Petar Aleksic, Jersey City, NJ (US);
Pedro J. Moreno Mengibar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 70 days.

(21) Appl. No.: 14/989,642

(22) Filed: Jan. 6, 2016

(65) Prior Publication Data

US 2017/0193999 A1 Jul. 6, 2017

(51) Int. Cl.
*G06F 17/27* (2006.01)
*G10L 15/22* (2006.01)
*G10L 15/26* (2006.01)
*G10L 15/04* (2013.01)
*G06F 17/30* (2006.01)

(52) U.S. Cl.
CPC ........ *G10L 15/26* (2013.01); *G06F 17/30755* (2013.01); *G10L 15/04* (2013.01)

(58) Field of Classification Search
CPC combination set(s) only.
See application file for complete search history.

(56) References Cited

U.S. PATENT DOCUMENTS

| 8,352,245 | B1 | 1/2013 | Lloyd |
| 8,352,246 | B1 * | 1/2013 | Lloyd .................... G10L 15/183 704/9 |
| 8,417,530 | B1 | 4/2013 | Hayes |
| 8,554,559 | B1 | 10/2013 | Aleksic et al. |
| 8,700,393 | B2 | 4/2014 | Aleksic et al. |
| 8,805,684 | B1 | 8/2014 | Aleksic et al. |
| 8,849,664 | B1 | 9/2014 | Lei et al. |
| 8,880,398 | B1 | 11/2014 | Aleksic et al. |
| 9,043,205 | B2 | 5/2015 | Mengibar et al. |
| 2007/0100618 | A1 * | 5/2007 | Lee ..................... G10L 15/1822 704/238 |

(Continued)

FOREIGN PATENT DOCUMENTS

| CN | 101266793 | 9/2008 |
| WO | 1999/050830 | 10/1999 |
| WO | 2013/192218 | 12/2013 |

OTHER PUBLICATIONS

International Search Report and Written Opinion in International Application No. PCT/US2016/064092, dated Mar. 1, 2017, 12 pages.

*Primary Examiner* — Shreyans Patel
(74) *Attorney, Agent, or Firm* — Honigman Miller Schwartz and Cohn LLP

(57) ABSTRACT

Methods, systems, and apparatus, including computer programs encoded on a computer storage medium, for voice recognition. In one aspect, a method includes the actions of receiving a voice input; determining a transcription for the voice input, wherein determining the transcription for the voice input includes, for a plurality of segments of the voice input: obtaining a first candidate transcription for a first segment of the voice input; determining one or more contexts associated with the first candidate transcription; adjusting a respective weight for each of the one or more contexts; and determining a second candidate transcription for a second segment of the voice input based in part on the adjusted weights; and providing the transcription of the plurality of segments of the voice input for output.

20 Claims, 5 Drawing Sheets

(56) References Cited

U.S. PATENT DOCUMENTS

2013/0110492 A1    5/2013   McGraw et al.
2015/0058018 A1*   2/2015   Georges .................. G10L 15/08
                                                                                                        704/257

* cited by examiner

VOICE RECOGNITION SYSTEM

BACKGROUND

This specification relates to voice recognition.

Conventional voice recognition systems aim to convert a voice input from a user into a text output. The text output can be used for various purposes including, for example, as a search query, a command, a word processing input, etc. In a typical voice search system, a voice interface receives a user's voice input and provides the voice input to a voice recognition engine. The voice recognition engine converts the voice input to a text search query. The voice search system then submits the text search query to a search engine to obtain one or more search results.

SUMMARY

In general, one innovative aspect of the subject matter described in this specification can be embodied in methods that include the actions of receiving a voice input; determining a transcription for the voice input, wherein determining the transcription for the voice input includes, for a plurality of segments of the voice input: obtaining a first candidate transcription for a first segment of the voice input; determining one or more contexts associated with the first candidate transcription; adjusting a respective weight for each of the one or more contexts; and determining a second candidate transcription for a second segment of the voice input based in part on the adjusted weights; and providing the transcription of the plurality of segments of the voice input for output. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The method includes obtaining a first candidate transcription for a first segment of the voice input including: determining that the first segment of the voice input satisfies stability criteria; and, in response to determining that the first segment of the voice input satisfies stability criteria, obtaining the first candidate transcription for the first segment of the voice input. The stability criteria include one or more semantic characteristics of the first segment of the voice input. The stability criteria include a time delay occurring after the first segment of the voice input. The second segment of the voice input occurs after the first segment of the voice input. The one or more contexts are received from a user device. The one or more contexts include data including a user's geographic location, a user's search history, user's interests, or a user's activity. The method includes storing a plurality of scores for a plurality of contexts; and, in response to adjusting a respective weight for each of the one or more contexts, updating the adjusted scores for the one or more contexts. The method further includes providing the output as a search query; and providing, in response to the search query, one or more search results to a user device. The first candidate transcription comprises a word, sub-word, or group of words.

Particular embodiments of the subject matter described in this specification can be implemented so as to realize one or more of the following advantages. Compared to a conventional voice recognition system, a voice recognition system can provide more accurate text search queries based on a segment of a voice input. Since the system adjusts weights for contexts based on the segment of the voice input and determines a transcription of the following segment of the voice input based in part on the adjusted weights, the system can dynamically improve recognition performance. Thus, the system can enhance accuracy of voice recognition.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1:
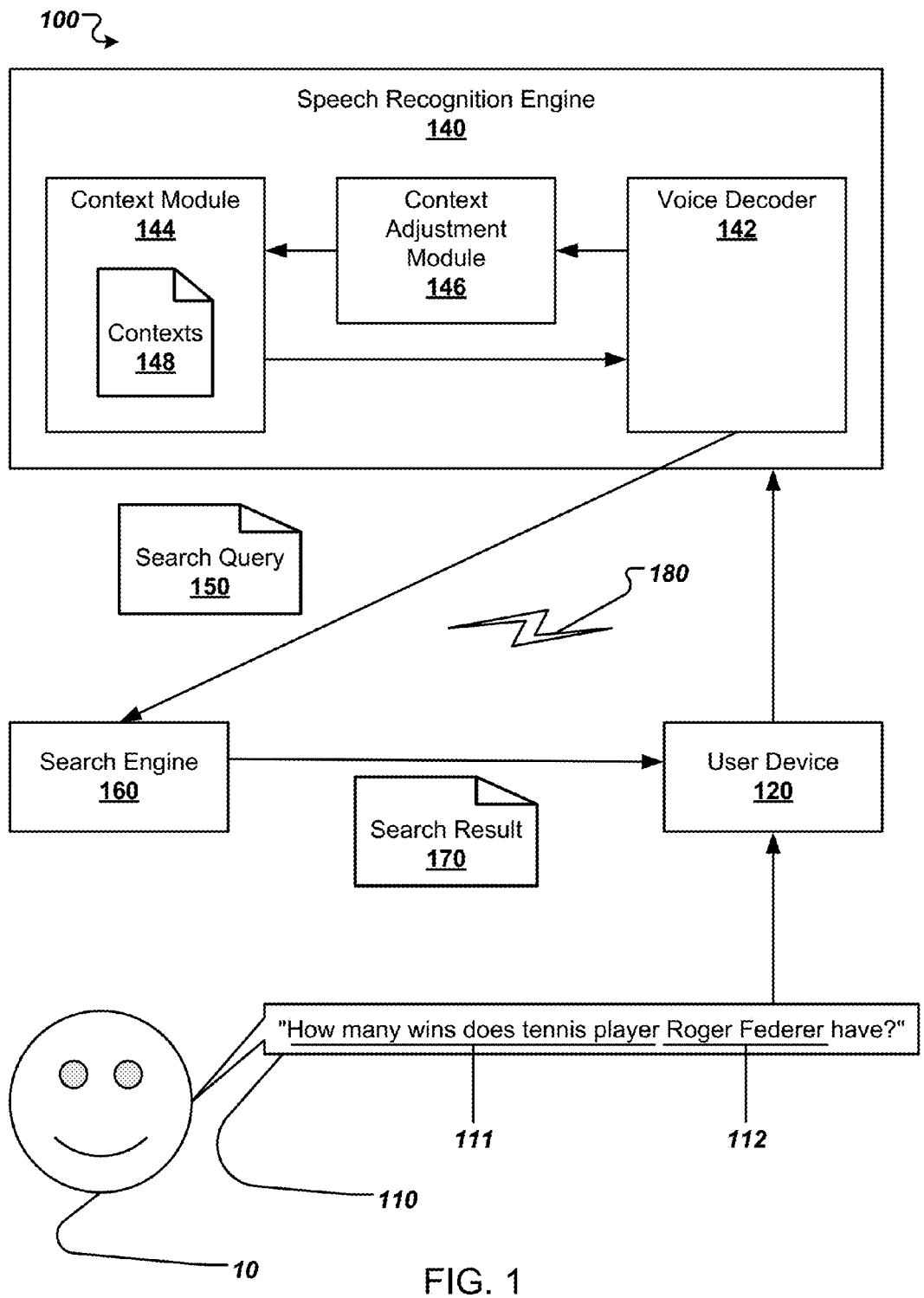
FIG. 1 is a diagram providing an overview of an example voice recognition system.

FIG. 1 is a diagram providing an overview of an example voice recognition system 100. A voice search system 100 includes one or more computers programmed to receive, from a user device 120, a voice input 110 from a user 10, determine a transcription of the voice input 110, and provide the transcription of the voice input 110 as an output. In the example show in FIG. 1, the output can be a search query 150 that is provided to a search engine 160 to obtain search results 170 responsive to the search query 150. One or more search results 170 are then provided to the user device 120. The voice recognition system 100 can be implemented, for example, on one or more computers including a server or on a user device.

The voice recognition system 100 includes a speech recognition engine 140 in communication with the user device 120 over one or more networks 180. The one or more networks 180 can be phone and/or computer networks including wireless cellular networks, wireless local area networks (WLAN) or Wi-Fi networks, wired Ethernet networks, other wired networks, or any suitable combination thereof. The user device 120 may be any suitable type of computing device, including but not limited to a mobile phone, a smartphone, a tablet computer, a music player, an e-book reader, a laptop or desktop computer, PDA, or other handheld or mobile device, that includes one or more processors and computer readable media.

The user device 120 is configured to receive the voice input 110 from the user 10. The user device 120 can include, for example, an acoustic-to-electric transducer or sensor (e.g., a microphone) coupled to the user device 120. In response to the user 10 entering the voice input 110, the voice input can be submitted to the speech recognition engine 140.

The speech recognition engine 140 can recognize the voice input sequentially, e.g., a first portion 111 of the voice input 110 can be recognized and then a second portion 112 of the voice input 110 can be recognized. One or more portions of the voice input 110 may be recognized as an individual segment of the voice input 110 based on particular stability criteria. A portion may include a word, subword, or group of words. In some implementations, one or more segments of the voice input 110 can provide intermediate recognition results that can be used to adjust one or more contexts as described in greater detail below.

Although an example of a search query is used throughout for illustration, the voice input 110 can represent any type of voice communication including voice-based instructions, search engine query terms, dictation, dialogue systems, or any other input that uses transcribed speech or that invokes a software application using transcribed speech to perform an action.

The speech recognition engine 140 can be a software component of the voice search system 100 configured to receive and process the voice input 110. In the example system shown in FIG. 1, the speech recognition engine 140 converts the voice input 110 into a textual search query 150 that is provided to the search engine 160. The speech recognition engine 140 includes a voice decoder 142, a context module 144, and a context adjustment module 146. The voice decoder 142, the context module 144, and the context adjustment module 146 can be software components of the voice search system 100.

As the speech recognition engine 140 receives the voice input 110, the voice decoder 142 determines the transcription for the voice input 110. The voice decoder 142 then provides the transcription for the voice input 110 as an output, e.g., as the search query 150 to be provided to the search engine 160.

The voice decoder 142 uses a language model to generate candidate transcriptions for the voice input 110. The language model includes probability values associated with words or sequences of words. For example, the language model can be an N-gram model. Intermediate recognition results can be determined as the voice decoder 142 processes the voice input. Each of the intermediate recognition results corresponds to a stable segment of the transcription of the voice input 110. Stability criteria for determining a stable segment of the transcription are described in greater detail below with respect to FIG. 3.

The voice decoder 142 provides each stable segment to the context adjustment module 146. The context adjustment module 146 identifies relevant contexts from the context module 144. Each identified context may be associated with a weight. Base weights for each context may be initially specified according to various criteria, for example, based on a popularity of the contexts, time closeness of the contexts (i.e., whether a particular context is actively used in a recent time period), or recent or global usage of the contexts. The base weight can create an initial bias based on a likelihood that a user input is associated with particular contexts. Once the context adjustment module 146 identifies relevant contexts, the context adjustment module 146 adjusts weights to the contexts based on the one or more stable segments provided by the voice decoder 142. The weights can be adjusted to indicate the extent to which transcriptions of voice inputs are associated with particular contexts.

The context module 144 stores the contexts 148 and weights associated with the contexts 148. The context module 144 can be a software component of the speech recognition engine 140 configured to cause a computing device to receive one or more contexts 148 from the user device 120. The speech recognition engine 140 may be configured to store the received contexts 148 in the context module 144. In some instances, the context module 144 can be configured to generate one or more contexts 148 customized for the user 10. The speech recognition engine 140 may be configured to store the generated contexts 148 in the context module 144.

The contexts 148 may include, for example, (1) data describing user activities such as time intervals between repeated voice inputs, gaze tracking information that reflects eye movement from a front-side camera near the screen of a user device; (2) data describing circumstances when a voice input is issued, such as the type of mobile application used, the location of a user, the type of device used, or the current time; (3) prior voice search queries submitted to a search engine; (4) data describing the type of voice input submitted to a speech recognition engine, such as a command, a request, or a search query to a search engine, and (5) entities, for example, members of particular categories, place names, etc. Contexts can be formed, for example, from prior search queries, user information, entity databases, etc.

Figure 2:
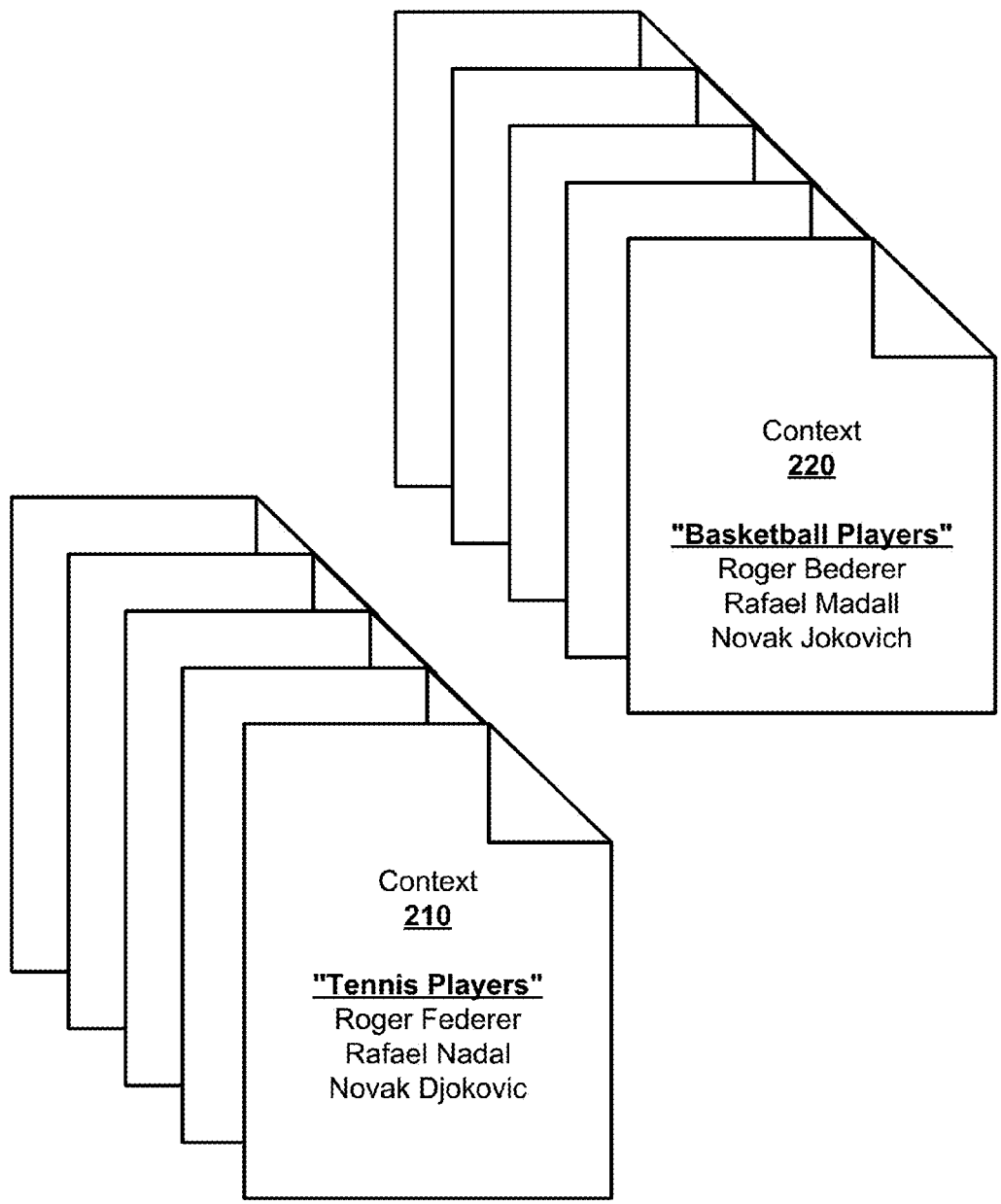
FIG. 2 is a diagram illustrating example contexts.

FIG. 2 is a diagram illustrating example contexts. A speech recognition engine is configured to store a context 210 associated with "tennis players" and a context 220 associated with "basketball players," e.g., in a context module, e.g., the context module 144. The context 210 includes with entities that correspond to particular tennis players, for example, "Roger Federer," "Rafael Nadal," and "Novak Djokovic." The context 220 includes with entities that correspond to particular basketball players, for example, "Roger Bederer," "Rafael Madall," and "Novak Jocovich."

The context module 144 may be configured to store weights for the contexts 210, 220. The weights may indicate the extent to which one or more transcriptions of voice inputs are associated with the contexts 210, 220. When the context adjustment module 146 identifies the contexts 210, 220, the context adjustment module also identifies the weights associated with the contexts 210, 220.

When the voice decoder 142 obtains the first candidate transcription "how many wins does tennis player" for the first segment 111 of the voice input 110, the voice decoder 142 provides the first candidate transcription for the first segment 111 to the context adjustment module 146. The context adjustment module 146 identifies the contexts 210, 220 as relevant contexts from the context module 144, and the weights associated with the contexts 210, 220. Then, the context adjustment module 146 is configured to adjust the respective weights for the contexts 210, 220 based on the first candidate transcription for the first segment 111 of the voice input 110. In particular, the context adjustment module 146 can adjust the respective weights for the contexts 210, 220 for use in recognizing subsequent segments of the voice input 110.

The base weights for the respective contexts may have initially biased the voice recognition toward the context of basketball having a higher initial weight, for example due to a historical popularity of voice inputs relating to basketball as compared to tennis. However, adjusted based on the intermediate recognition result, the voice recognition may be biased toward the context of tennis. In this example, the first candidate transcription "how many wins does tennis player" of the voice input 110 includes the term "tennis player." Based on the term "tennis player" of the first candidate transcription, the context adjustment module 146 may be configured to adjust the weight for one or more of the contexts. For example, the context adjustment module 146 can boost the weight for the context 210 e.g., from "10" to "90," can decrement the weight for the context 220 e.g., from "90" to "10," or can perform a combination of boosting and decrementing of weights.

The voice decoder 142 may be configured to determine the second candidate transcription for the second segment 112 of the voice input 110 based in part on the adjusted weights. In response to adjusting the respective weights for the contexts, the speech recognition engine 140 may be configured to update the adjusted weights for the contexts 210, 220 in the context module 144. In the example above, to determine the second candidate transcription for the second segment 112 of the voice input 110, the voice decoder 142 may give more weight to the context 210 than the context 220 based on the adjusted weights. Based on the weights to the context 210, the voice decoder 142 may determine "Roger Federer" as the second candidate transcription for the second segment 112 of the voice input 110.

By contrast, if the context adjustment module 146 does not adjust the weights for the contexts 210, 220 based on the first candidate transcription for the first segment 111, the voice decoder 142 may determine the second candidate transcription for the second segment 112 based on the base weights for the contexts 210, 220 stored in the context module 144. If the context 210 is more weighted than the context 210, the voice decoder may determine the names of the basketball players such as "Roger Bederer" as the second candidate transcription for the second segment 112. Thus, the voice decoder 142 may provide an incorrect recognition result.

After the voice decoder 142 obtains the whole transcription of the voice input 110, the voice decoder 142 may provide the transcription of the voice input 110 for output. The output can be provided directly to the user device or can be used for additional processing. For example, in FIG. 1, the output recognition is used as a text search query 150. For example, when the voice decoder 142 determines "Roger Federer" as the second candidate transcription for the second segment 112 of the voice input 110, the voice decoder 142 may output the whole transcription "how many wins does tennis player Roger Federer have?" as the search query 150 to the search engine 160.

The search engine 160 performs search using the search query 150. The search engine 160 may include a web search engine coupled to the voice search system 100. The search engine 160 may determine one or more search results 170 responsive to the search query 150. The search engine 160 provides the search results 170 to the user device 120. The user device 120 can include a display interface to present the search results 170 to the user 10. In some instances, the user device 120 can include an audio interface to present the search results 170 to the user 10.

Figure 3:
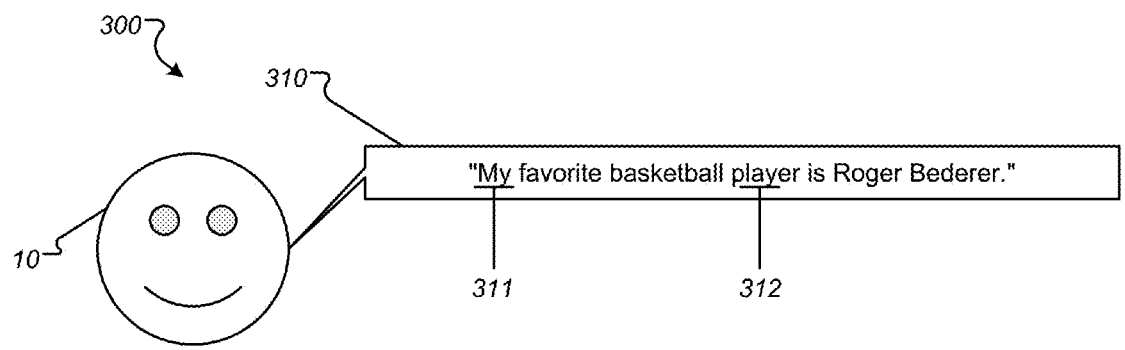
FIG. 3 is a diagram illustrating an example process for determining that stability criteria are satisfied.

FIG. 3 is a diagram illustrating an example process for determining that stability criteria are satisfied for a given segment. The voice decoder 142 is configured to determine that the portion of the voice input 110 satisfies the stability criteria.

When the voice decoder 142 receives the portion 311 of the voice input 310, the voice decoder 142 may be configured to determine whether the portion 311 of the voice input 310 satisfies the stability criteria. The stability criteria indicate whether or not the portion is likely to be changed by additional voice recognition.

The stability criteria may include one or more semantic characteristics. If a portion of a voice input is semantically expected to be followed by a word or words, the voice decoder 142 can determine that the portion does not satisfy the stability criteria. For example, when the voice decoder 142 receives the portion 311 of the voice input 310, the voice decoder 142 may determine that the portion 311 is semantically expected to be followed by a word or words. The voice decoder 142 then determines that the portion 311 does not satisfy the stability criteria. In some implementations, when the voice decoder 142 receives "mine" as a portion of a voice input, the voice decoder 142 may determine that the portion "mine" is not semantically expected to be followed by a word or words. The voice decoder 142 then can determine that the portion "mine" satisfies the stability criteria for a segment. The voice decoder 142 may provide the segment to the context adjustment module 146 to adjust the weights for contexts.

The voice decoder 142 may also determine that a portion does not satisfy the stability criteria if the portion is semantically expected to be followed by another sub-word or sub-words. For example, when the voice decoder 142 receives "play" as the portion 312 of the voice input 310, the voice decoder 142 may determine that the portion 312 is semantically expected to be followed by a word or words because the portion 312 can be semantically followed by a sub-word or sub-words such as "play-er," "play-ground," and "play-off." The voice decoder 142 then determines that the portion 311 does not satisfy the stability criteria. In some implementations, when the voice decoder 142 receives "player" as a portion of a voice input, the voice decoder 142 may determine that the portion "player" is not semantically expected to be followed by a word or words. The voice decoder 142 then can determine that the portion "player" satisfies the stability criteria for a segment. The voice decoder 152 may provide the segment to the context adjustment module 146 to adjust the weights for contexts.

In some implementations, the stability criteria may include a time delay occurring after a portion of the voice input 310. The voice decoder 142 can determine that the portion of the voice input 310 satisfies the stability criteria if the time delay after the portion of the voice input 310 has a duration that satisfies a threshold delay value. When the voice decoder 142 receives the portion of the voice input 310, the voice decoder 142 may measure the time delay from the moment that the portion is received to the moment that the following portion of the voice input 310 is received. The voice decoder 142 can determine that the portion satisfies the stability criteria if the time delay exceeds the threshold delay value.

Figure 4:
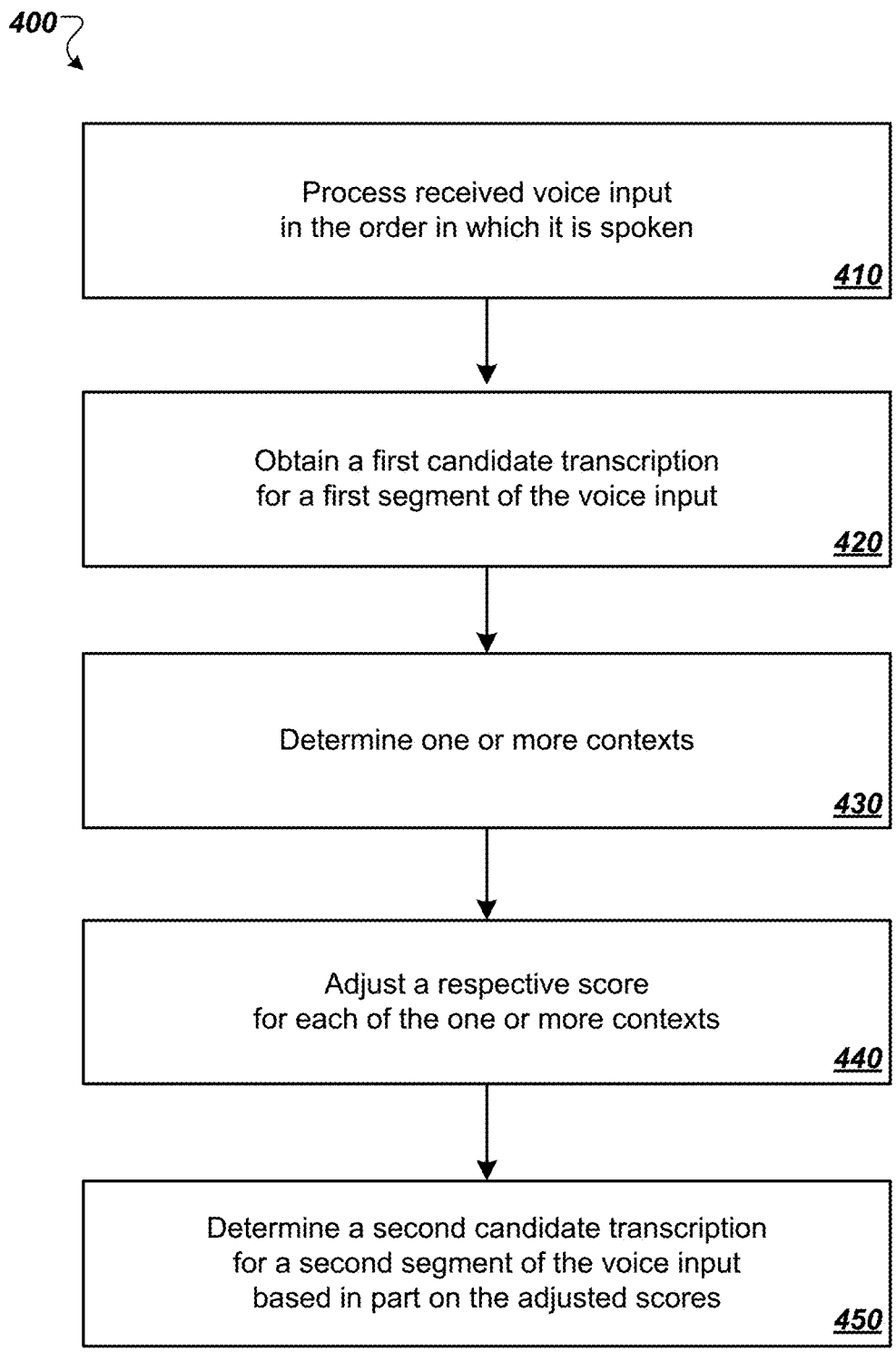
FIG. 4 is a flowchart of an example method for providing a transcription of a voice input.

FIG. 4 is a flowchart of an example method 400 for determining a transcription for a received voice input. For convenience, the method 400 will be described with respect to a system that performs the method 400.

The system processes (410) the received voice input in the order in which it is spoken to determine a portion of the voice input as a first segment. The system obtains (420) a first candidate transcription for the first segment of the voice input. To obtain the first candidate transcription for the first segment, the system may determine whether the first segment of the voice input satisfies stability criteria. If the first segment of the voice input satisfies the stability criteria, the system may obtain the first candidate transcription for the first segment. If the first segment of the voice input does not satisfy the stability criteria, the system may not obtain the first candidate transcription. Then, the system may receive one or more portions of the voice input and recognize a new first segment of the voice input to determine whether the new first segment of the voice input satisfies the stability criteria. The system may use the process 300 to determine that the first segment of the voice input satisfies the stability criteria as described above with FIG. 3.

The system determines (430) one or more contexts that are relevant to the first segment from a collection of contexts. Particular contexts that are relevant to the first segment can be determined based on the context provided by the first segment. For example, particular keywords of the first segment can be identified as relevant to particular contexts. Referring back to FIG. 2, the system may identify the context associated with "tennis players" and the context associated with "basketball players." The tennis player context can be associated with keywords such as "Roger Federer," "Rafael Nadal," and "Novak Djokovic." The basketball player context can be associated with keywords such as "Roger Bederer," "Rafael Madall," and "Novak Jocovich." The system may be configured to store a weights for each of the contexts. When the system identifies the contexts the system may also identify the respective weights for the contexts. The respective weights for the contexts indicate the extent to which one or more transcriptions of voice inputs are associated with the contexts.

The system adjusts (440) the respective weight for each of the one or more contexts. The system may adjust the respective weight for each of the contexts based on the first candidate transcription of the voice input. For example, the first candidate transcription "how many wins does tennis player" of the voice input includes the term "tennis player." Based on the term "tennis player" of the first candidate transcription, the system may be configured to adjust the weights for the contexts. For example, the system can boost the weight for the context e.g., from "10" to "90," can decrement the weight for the context e.g., from "90" to "10," or can perform a combination of boosting and decrementing of weights.

In some implementations, only the weight of the most relevant context is adjusted (e.g., increased), while all other contexts are held constant. In some other implementations, all other contexts are decremented while the most relevant context is held constant. Further, any suitable combination of the two can occur. For example, the relevant context may be promoted by a different amount than another context is decremented.

The system determines (450) a second candidate transcription for a second segment of the voice input based in part on the adjusted weights. In response to adjusting the respective weights for the contexts, the system may update the adjusted weights for the contexts. For example, the system may give more weight to the first context identified as more relevant to the first segment than a second context based on the adjusted weights. Based on the adjusted weighted context, the voice decoder may determine the second candidate transcription for the second segment of the voice input. This process continues until there are no additional portions of the voice input to recognize.

Figure 5:
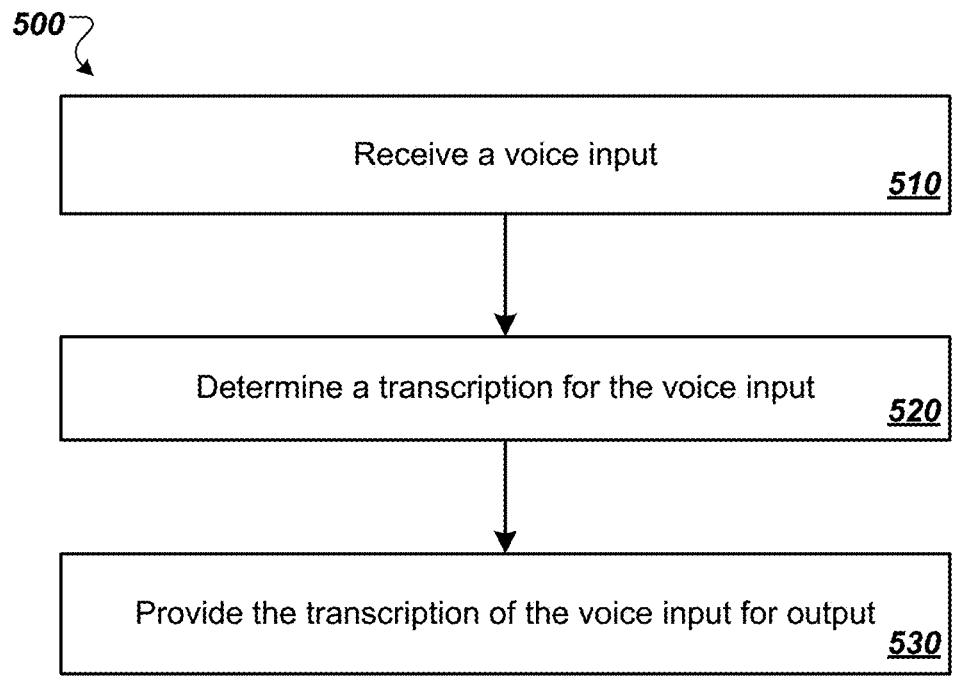
FIG. 5 is a flowchart of an example method for determining a transcription for a voice input.

FIG. 5 is a flowchart of an example method 500 for providing voice searching. For convenience, the method 500 will be described with respect to a system that performs the method 500.

The system receives (510) a voice input. The system may be configured to receive the voice input from a user. The system can receive each segment of the voice input in real-time while the user is speaking.

As the system receives the voice input, the system determines (520) a transcription for the voice input. The system determines the transcript, for example, as described above with respect to FIG. 4. Once the system determines (520) the whole transcription of the voice input, the system provides (530) the transcription of the voice input for output. The system may provide the output as a text search query. The system can perform search using the text search query and acquire search results. The system may provide the search results to the user. In some implementations, the system can provide a display interface to present the search results to the user. In other implementations, the system can provide an audio interface to present the search results to the user.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media for execution by, or to control the operation of, a data processing apparatus. Alternatively or in addition, the program instructions can be encoded on an artificially-generated propagated signal, e.g., a machine-generated electrical, optical, or electromagnetic signal, that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processing unit, a computer, a system on a chip, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processing units executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processing units suitable for the execution of a computer program include, by way of example, both general and special purpose microprocessors, and any one or more processing units of any kind of digital computer. Generally, a processing unit will receive instructions and data from a read-only memory or a random access memory or both. The essential elements of a computer are a processing unit for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, a network routing device, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processing unit and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or a routing device, e.g., a network router, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs executing on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what can be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous. Accordingly, other embodiments are within the scope of the following claims.

What is claimed is:

1. A method comprising:
receiving a voice input;
determining a transcription for the voice input, wherein determining the transcription for the voice input includes, for a plurality of segments of the voice input:
maintaining a plurality of contexts and respective base weights associated with the plurality of contexts;
obtaining a first candidate transcription for a first segment of the voice input;
determining one or more contexts, from the plurality of contexts, associated with the first candidate transcription;
identifying one or more base weights respectively corresponding to the one or more contexts;
adjusting a respective base weight of the one or more base weights for each of the one or more contexts based on the first candidate transcription; and
determining a second candidate transcription for a second segment of the voice input based in part on the adjusted base weights; and
providing the transcription of the plurality of segments of the voice input for output.

2. The method of claim 1, wherein obtaining a first candidate transcription for a first segment of the voice input comprising:
determining that the first segment of the voice input satisfies stability criteria; and
in response to determining that the first segment of the voice input satisfies stability criteria, obtaining the first candidate transcription for the first segment of the voice input.

3. The method of claim 2, wherein the stability criteria include one or more semantic characteristics of the first segment of the voice input.

4. The method of claim 2, wherein the stability criteria include a time delay occurring after the first segment of the voice input.

5. The method of claim 1, wherein the second segment of the voice input occurs after the first segment of the voice input.

6. The method of claim 1, wherein the one or more contexts are received from a user device.

7. The method of claim 6, wherein the one or more contexts include data including a user's geographic location, a user's search history, user's interests, or a user's activity.

8. The method of claim 1, comprising:
storing a plurality of scores for a plurality of contexts; and
in response to adjusting a respective base weight for each of the one or more contexts, updating the adjusted scores for the one or more contexts.

9. The method of claim 1, further comprising:
providing the output as a search query; and
providing, in response to the search query, one or more search results to a user device.

10. The method of claim 1, wherein the first candidate transcription comprises a word, sub-word, or group of words.

11. A system comprising:
one or more computers and one or more storage devices storing instructions that are operable, when executed by the one or more computers, to cause the one or more computers to perform operations comprising:
receiving a voice input;
determining a transcription for the voice input, wherein determining the transcription for the voice input includes, for a plurality of segments of the voice input:
maintaining a plurality of contexts and respective base weights associated with the plurality of contexts;
obtaining a first candidate transcription for a first segment of the voice input;
determining one or more contexts, from the plurality of contexts, associated with the first candidate transcription;
identifying one or more base weights respectively corresponding to the one or more contexts;
adjusting a respective base weight of the one or more base weights for each of the one or more contexts based on the first candidate transcription; and
determining a second candidate transcription for a second segment of the voice input based in part on the adjusted base weights; and
providing the transcription of the plurality of segments of the voice input for output.

12. The system of claim 11, wherein obtaining a first candidate transcription for a first segment of the voice input comprising:
determining that the first segment of the voice input satisfies stability criteria; and
in response to determining that the first segment of the voice input satisfies stability criteria, obtaining the first candidate transcription for the first segment of the voice input.

13. The system of claim 12, wherein the stability criteria include one or more semantic characteristics of the first segment of the voice input.

14. The system of claim 12, wherein the stability criteria include a time delay occurring after the first segment of the voice input.

15. The system of claim 11, wherein the second segment of the voice input occurs after the first segment of the voice input.

16. The system of claim 11, wherein the one or more contexts are received from a user device.

17. The system of claim 16, wherein the one or more contexts include data including a user's geographic location, a user's search history, user's interests, or a user's activity.

18. The system of claim 11, wherein the one or more computers are configured to perform operations comprising:
storing a plurality of scores for a plurality of contexts; and
in response to adjusting a respective base weight for each of the one or more contexts, updating the adjusted scores for the one or more contexts.

19. The system of claim 11, wherein the one or more computers are configured to perform operations comprising:
providing the output as a search query; and
providing, in response to the search query, one or more search results to a user device.

20. A non-transitory computer-readable medium storing software comprising instructions executable by one or more computers which, upon such execution, cause the one or more computers to perform operations comprising:
receiving a voice input;
determining a transcription for the voice input, wherein determining the transcription for the voice input includes, for a plurality of segments of the voice input:
maintaining a plurality of contexts and respective base weights associated with the plurality of contexts;
obtaining a first candidate transcription for a first segment of the voice input;
determining one or more contexts, from the plurality of contexts, associated with the first candidate transcription;
identifying one or more base weights respectively corresponding to the one or more contexts;
adjusting a base respective weight of the one or more base weights for each of the one or more contexts based on the first candidate transcription; and
determining a second candidate transcription for a second segment of the voice input based in part on the adjusted base weights; and
providing the transcription of the plurality of segments of the voice input for output.

* * * * *